UNITED STATES PATENT OFFICE.

RUDOLPH BERENDES, OF ELBERFELD, GERMANY, ASSIGNOR TO FARBENFABRIKEN VORM. FRIEDR. BAYER & CO., OF ELBERFELD, GERMANY, A CORPORATION OF GERMANY.

SANTALOL COMPOUND.

979,639. Specification of Letters Patent. Patented Dec. 27, 1910.

No Drawing. Application filed April 28, 1910. Serial No. 558,156. (Specimens.)

*To all whom it may concern.*

Be it known that I, RUDOLPH BERENDES, doctor of philosophy, chemist, citizen of the German Empire, residing at Elberfeld, Germany, have invented new and useful Improvements in Santalol Compounds, of which the following is a specification.

My invention relates to the production of the hitherto unknown alkylaminoacetic acid esters of santalol from oil of santal which possess valuable therapeutic properties, being useful substitutes for santalol without its disagreeable properties and possessing the advantage over other santalol preparations that they form solid salts with acids which are odorless and easily absorbed by the human body. They are especially qualified for the treatment of gonorrhea, cystitis, etc., an average dose being between 0.2 to 0.5 gram. The process for producing the new compounds consists in treating halogen acetyl compounds of santalol from oil of santal with secondary amins according to the following equation:

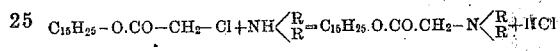

(R means alkyl, such as methyl and ethyl.)

The new products are oils which are soluble in alcohol and ether and are insoluble in water.

In order to illustrate the new process more fully the following example is given, the parts being by weight:—220 parts of santalol are converted into chloroacetyl-santalol by treating it with chloroacetyl chlorid and pyridin or with chloroacetic acid, phosgene and pyridin. The chloroacetyl santalol thus produced is a thick oil. It is mixed while cooling with 90 parts of dimethylamin dissolved in benzene and the mixture is allowed to stand for 24 hours. Subsequently the dimethylamin hydrochlorid separated is filtered off and the benzene solution is shaken with dilute hydrochloric acid in order to dissolve the dimethylaminoacetylsantalol. This compound is then isolated by adding a solution of sodium carbonate to the hydrochloric acid solution. It is a yellowish odorless oil. Its hydrochlorid crystallizes from acetone in the shape of tasteless and odorless needles melting at 154° C. which are soluble in water to a limpid solution of an acid reaction. One can also start from oil of santal in which case the procedure remains the same. Other secondary amins such as diethylamin can be used.

I claim:—

1. The herein described new alkylamino acetic acid esters of santalol, obtainable by treating chloroacetyl santalol with a secondary amin, which are oils soluble in alcohol and ether and insoluble in water, forming solid salts with acids, which salts also exhibit the valuable therapeutic properties of the bases, substantially as described.

2. The herein described new dimethyl-aminoacetyl santalol obtainable by treating chloroacetylsantalol with dimethylamin, which is an oil soluble in alcohol and ether and insoluble in water, forming solid salts with acids, which salts also exhibit the valuable therapeutic properties of the base; the hydrochlorid melting at 154° C., substantially as described.

In testimony whereof I have hereunto set my hand in the presence of two subscribing witnesses.

RUDOLPH BERENDES. [L. S.]

Witnesses:
 OTTO KÖNIG,
 CHAS. J. WRIGHT.